United States Patent [19]

Kinoshita et al.

[11] Patent Number: 4,773,006
[45] Date of Patent: Sep. 20, 1988

[54] VECTOR OPERATION DESIGNATOR

[75] Inventors: Yoshiaki Kinoshita; Yoshiharu Kazama, both of Hadano; Shunsuke Miyamoto, Tokyo; Koichiro Omoda, Sagamihara; Takayuki Nakagawa, Kokubunji, all of Japan

[73] Assignee: Hitachi, Ltd., Tokyo, Japan

[21] Appl. No.: 813,007

[22] Filed: Dec. 24, 1985

[30] Foreign Application Priority Data

Dec. 29, 1984 [JP] Japan .............................. 59-279655

[51] Int. Cl.⁴ ........................... G06F 7/48; G06F 3/00
[52] U.S. Cl. ............................... 364/200; 364/736
[58] Field of Search ... 364/200 MS File, 900 MS File, 364/736

[56] References Cited

U.S. PATENT DOCUMENTS

| | | | |
|---|---|---|---|
| 3,962,706 | 6/1976 | Dennis et al. | 364/900 |
| 4,128,880 | 12/1978 | Cray, Jr. | 364/200 |
| 4,525,796 | 6/1985 | Omoda et al. | 364/200 |
| 4,591,971 | 5/1986 | Darlington et al. | 364/200 |
| 4,617,625 | 10/1986 | Nagashima et al. | 364/200 |
| 4,661,900 | 4/1987 | Chen et al. | 364/200 |

*Primary Examiner*—Gary V. Harkcom
*Assistant Examiner*—Randy W. Lacasse
*Attorney, Agent, or Firm*—Antonelli, Terry & Wands

[57] ABSTRACT

In a vector processor for performing an operation on first and second vectors for each vector element, an operation code is set for each vector element of at least one of the first and second vectors to designate the type of an operation to be executed on the vector element, and the operation is carried out on the first and second vectors for each vector element based on the operation code.

4 Claims, 2 Drawing Sheets

VECTOR OPERATION DESIGNATOR

BACKGROUND OF THE INVENTION

1. Field of the Invention

The present invention relates to a vector processor for processing a computation of a matrix having a great number of elements or the like at a high speed.

2. Description of the Prior Art

A vector processor has been utilized to rapidly process calculations, for example, of a matrix including a large number of elements which are frequently required in scientific applications. A configuration of a vector processor has been disclosed in, for example, U.S. Pat. Nos. 4,128,880 and 4,433,394.

A program written in the FORTRAN language as follows can be executed at a high speed by using a vector operation.

```
DO 10 i = 1, N
    A(i) = B(i) + C(i)
10 CONTINUE
```

That is, the result of an addition of each vector element (B(i), C(i)) is stored as vector A (A(i), i=1, N), where vectors B and C are (B(i), i=1, N) and (C(i), i=1, N), respectively. In this fashion, the vector processor can rapidly process a computation between vector elements based on a vector processing scheme.

Assume that the above-mentioned FORTRAN program is to be changed as follows.

```
DO 10 i = 1, N − 20
    A(i) = B(i) + C(i)
10 CONTINUE
DO 20 i = 1, 20
    J = i + N − 20
    A(J) = B(J) − C(J)
20 CONTINUE
```

In this case, each element of vectors B(1) to B(N-20) and each element of vectors C(1) to C(N-20) are added, whereas each element of vectors C(N-19) to C(N) is subtracted from each element of vectors B(N-19) to B(N), and the results must be stored as the vector A.

If the prior art vector processor is used to execute the vector processing, only one type of operator, such as addition or subtraction can be designated for processing one or each vector, and hence the vector processing must be executed twice, which has been a bottleneck for a high-speed processing.

SUMMARY OF THE INVENTION

It is therefore an object of the present invention to achieve a high-speed processing including a plurality of types of computations in a vector processor; furthermore, to execute such a processing by a single vector operation.

In accordance with the present invention, an operation code is prepared for each vector element to designate the type of operation to be effected on the vector element, and the operation is performed for each vector element in accordance with the operation code. Thereby, different types of operation can be achieved for two vectors in a vector operation.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
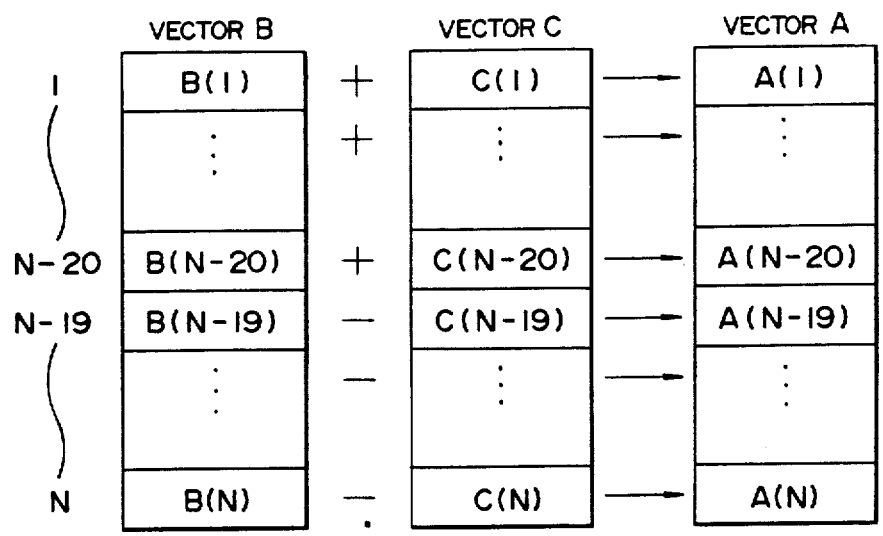
FIG. 1 is a schematic diagram illustrating a vector processing to which the present invention is suitably applied.

FIG. 1 shows an operation to which the present invention is applicable wherein an addition of A(i)= B(i)+C(i) is effected. For each vector element in the parameter range from 1 to N−20, for example, B(1) is added to C(1) and the result is stored as A(1) of vector A, in a register. That is, each element of vector B in the parameter range is added to each element of vector C in the parameter range and the result is stored in the register. For the vector elements in the parameter range from N−19 to N, each element of vector C in that parameter range is subtracted from each element of vector B in that parameter range and the result is stored in the register.

Figure 2:
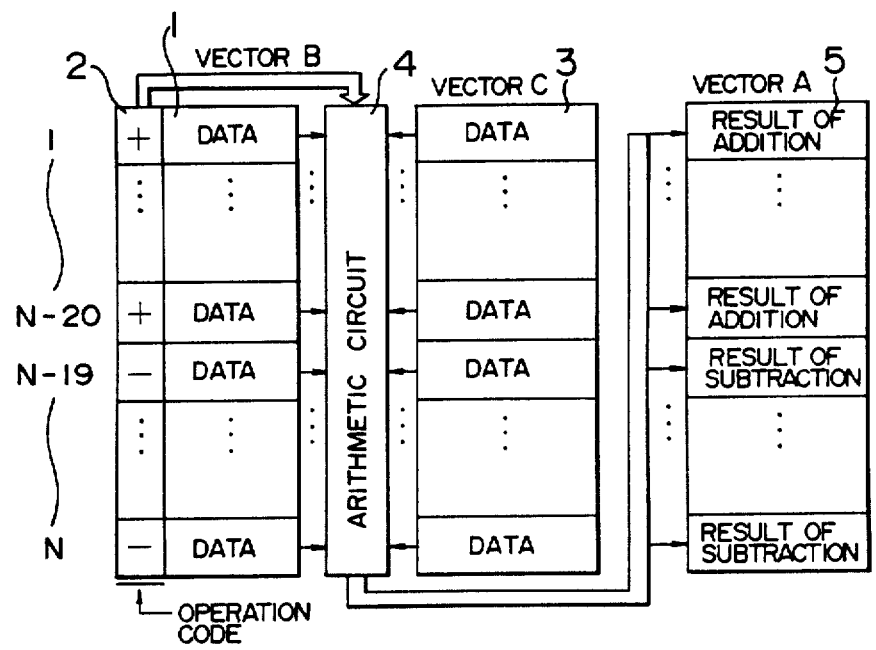
FIG. 2 is a diagram representing a concept of the present invention.

FIG. 2 schematically illustrates the concept of the present invention in which the operation of FIG. 1 is carried out by one vector operation. The vector processing system according to the embodiment comprises a register 1 for storing the vector B, an operation code 2 for designating the type of operation for each element of the vector B stored in the register 1, a register 3 for storing the vector C, an arithmetic circuit 4, and a register 5 for storing the vector A.

In accordance with the present invention, an operation code is added for each element of vector B to designate the type of operation associated with the element. In the example of FIG. 2, the operation code is "+" for the vector elements B(1) to B(N−20), while it is "−" for the vector elements B(N−19) to B(N). In the vector processing, the operation code is read together with data of each element of vector B, while data of each element is read from the vector C. These data items are supplied to the arithmetic circuit 4.

When executing computations for the respective elements of vectors B and C, the arithmetic circuit 4 operates in accordance with the operation code added for each element of vector B. That is, an addition is performed between the elements B(1) to B(N−20) and C(1) to C(N−20), while a subtraction is carried out between the elements B(N−19) to B(N) and C(N−19) to C(N), respectively. The results from the arithmetic circuit 4 are stored as result vector A in which elements A(1) to A(N−20) and A(N−19) to A(N) indicate the results of addition and subtraction, respectively.

In the manner described above, the processing as shown in FIG. 1 is implemented by executing a vector processing. Although the operation code is added for each element of vector B in FIG. 2, similar processing can be achieved by adding the operation code for each element of vector C instead of vector B.

Figure 3:
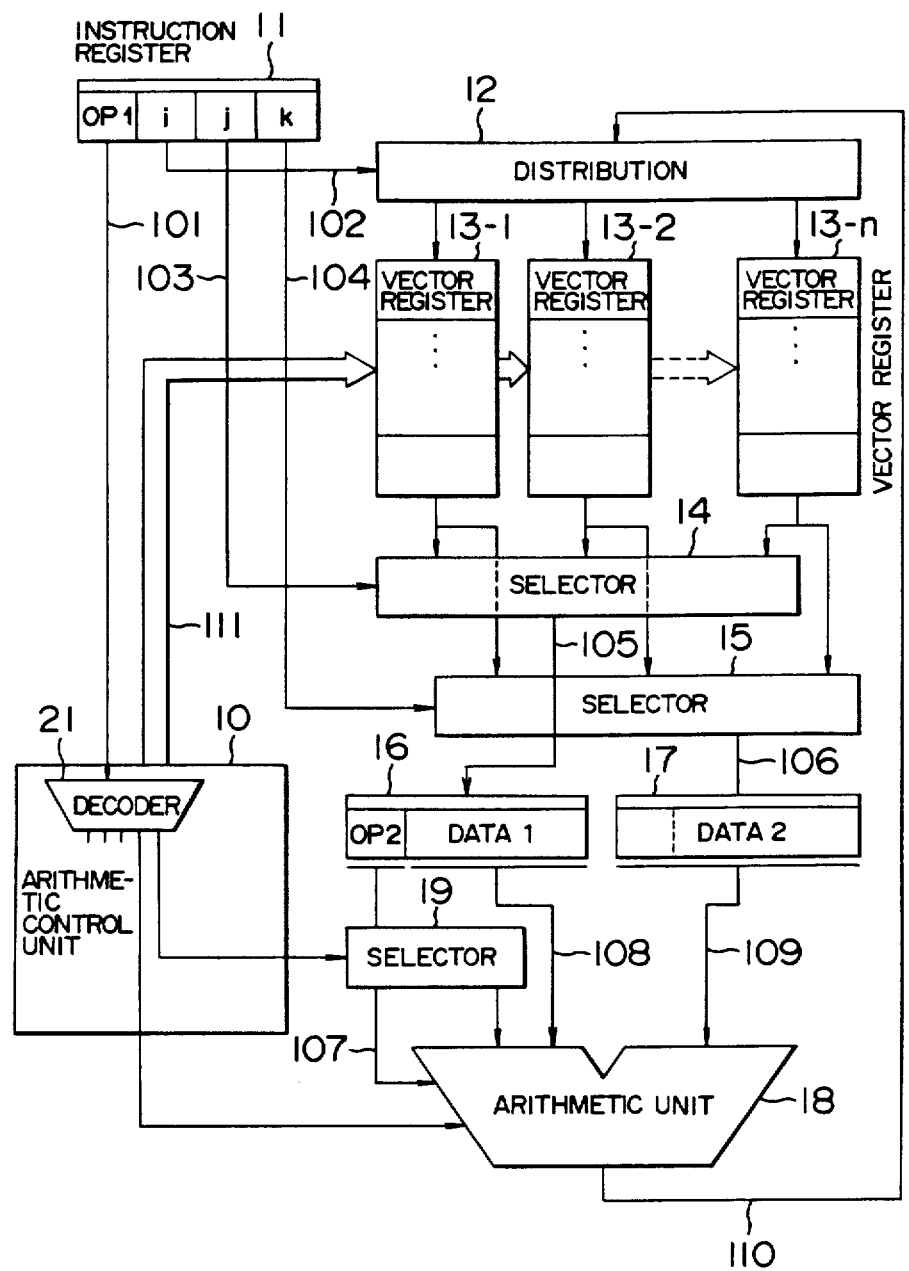
FIG. 3 is a schematic block diagram showing an embodiment of the present invention.

FIG. 3 shows in a schematic block diagram, the details of the vector processing system according to the embodiment of the present invention, in which a reference numeral 11 indicates a register for storing a vector instruction. The vector processing system includes vector registers 13-1 to 13-n for storing vector data and result vectors of vector operations. These registers 13-1 to 13-n each have a number of columns, for example, 128 columns each used to store therein a vector element.

A selector 14 is used to store in a register 16 only data from a designated one of the vector registers, and a selector 15 is provided to store in a register 17 only data from a designated one of the vector registers. The registers 16-17 stores data supplied via the selectors 14 and 15, respectively.

An arithmetic unit 18 executes a deginated operation by use of data stored in the registers 16-17. The result of the operation is delivered to a distributor 12, which in turn feeds the result data to a designated one of the vector registers.

The instruction register 11 comprises four fields in which an OP1 field indicates an operation code to be supplied via a signal line 101 to a decoder 21 of an arithmetic control unit 10. The operation code is used to control the execution of an instruction. An i field designates a vector register number of a register for storing the result vector. The field for the result vector is inputted via a signal line 102 to the distributor 12 to be used to determine one of the vector registers 13-1 to 13-n for storing the result vector inputted via a line 110. A j field designates an OP2 field to be described later and a vector register number of a vector register in which one of the vectors is stored. The content of the j field is inputted via a line 103 to the selector 14 to be used to select one of the vector registers 13-1 to 13-n. The content selected by the selector 14 is fed to a line 105. A k field designates a vector register number of a vector for storing the other data vector. The content of the k field is inputted via a line 104 to the selector 15 to be used to select one of the vector registers 13-1 to 13-n. The content selected by the selector 15 is supplied to a line 106. The system of FIG. 3 further comprises a register 16 for holding a vector element transferred from the selector 14 via the line 105 and a register 17 for holding a vector element transferred from the selector 15.

Several bits, for example, four bits of the register 16 beginning from the first bit are used by the selector 19 to selectively specify an operation type for the arithmetic/logic unit 18 or they are supplied as input data to the arithmetic/logic unit 18 like other bits of the register 16.

In a conventional vector operation, the following processing is carried out. The OP1 specifies a conventional vector operation. The decoder 21 decodes the specified operation and causes the selector 19 to load the arithmetic unit 18 with the several first bits of register 16 as input data together with the other bits thereof. A vector element is represented by 64 bits, for example. In the same fashion as the conventional technique, information designating an operation type obtained by decoding the vector operation in the decoder 21 is supplied to the arithmetic unit 18. Also in the same manner as the conventional processing, the columns associated with the vector registers 13-1 to 13-n are sequentially specified via a line 111 in response to the decoder 21, thereby generating a signal to effect a read or write operation. Vector elements are read from two vector registers selected according to the j and k fields of the instruction register one by one and are stored in the registers 16 and 17, respectively. These elements are subjected to an operation of the arithmetic unit 18 as specified by the decoder 21. The result is stored in a vector register of the vector registers 13-1 to 13-n specified by the i field.

In order to perform the operation of FIG. 2 according to the present invention, an information data OP2 is added for each vector element as the first portion thereof to designate the type of operation to be effected on the vector element as shown in FIG. 2. For example, the vector element, OP2, and data fields have 64, 4, and 60 bits, respectively. For the vector elements of the other vector, a significant data is stored in the 60-bit field, excluding the four leading bits. Such data is loaded from a main storage (not shown) prior to the execution of an operation. A code designating a vector operation including plural types of operations is stored in the OP1 field of the instruction register 11. Decoding the content of the OP1 field, the decoder 21 causes the selector 19 to pass the four leading bits (OP2) of the register 16 to the arithmetic unit 18 to indicate the type of operation. Thus, the decoder 21 does not deliver to the arithmetic unit 18 any signal indicating the type of operation. The other procedures are the same as for the vector operation generally performed in the conventional system.

The arithmetic unit 18 is a circuit for performing a designated operation for a vector element of a vector inputted thereto and hence, performs an operation based on an output from the selector 19 i.e., an instruction from the OP2 field in place of the instruction from the decoder 21.

Next, the operation of the embodiment of FIG. 3 will be described in conjunction with the vector processing of FIG. 2.

When an instruction specifying execution of an operation is inputted to the instruction register 11, the contents of OP1, i, j, and k fields are transferred to the arithmetic control unit 10, the distributor 12, and the selectors 14 and 15, respectively. In accordance with instruction signals from the i, j, and k fields, the distributor 12, the selector 14, and the selector 15 respectively set the distribution route and selection routes. The arithmetic control unit 10 sends a read or write indication signal via a line 111 to a vector register selected from the vector registers 13-1 to 13-n for the operation, to sequentially read a vector element from the vector registers specified by the j and k fields and to write the result in a vector register specified by the i field at an appropriate timing. Since this operation is the same as that of the conventional vector processor, the details thereof will not be described in more detail.

When OP2 and data 1 fields of the register 16 and the data 2 field of the register 17 each are loaded for a vector element, data 1 and data 2 are fed from the registers 16 and 17 via the lines 108 and 109, respectively to the arithmetic unit 18. At the same time, an operation code of the OP2 field is extracted from the register 16 and is supplied to the arithmetic unit 18 via the selector 19 and line 107. The arithmetic unit 18 performs an operation on the data 1 and data 2 based on the operation code of the OP2 field and supplies the result to the line 110. The data on the line 110 is inputted to the distributor 12, which in turn stores the data in one of the vector registers 13-1 to 13-n. Such an operation is repeated for each vector element set into the registers 16 and 17.

An embodiment of the present invention has been described. Various modifications can be considered as follows.

For example, although the content of the OP2 field is stored in a vector register together with the data 1, a specific vector register may be used as a control register for storing the content of the OP2 field. In this case, the instruction register 11 requires a register number field for storing the register number of the control register so that the OP2 field is selected by a third selector other than the selectors 14 and 15. Moreover, there will be provided a register for storing the OP2 content.

In addition to the addition and subtraction operations as shown in FIG. 2, the operation code of the OP2 field may contain operations between two operators, such as the multiplication, division, logical AND, logical OR, and logical Exclusive OR. Furthermore, logical relationships such as equal to/unequal to and greater than/less than can also be used. In this case, the result of comparison is stored in a vector register. The vector register may be implemented by a vector mask register which can indicate the result of comparison by a bit (which register is generally used in a vector processor for performing masked vector operations.).

Although the vector data is stored in a vector register in the preferred embodiment, the same processing can be naturally possible by directly reading vector data from the main storage. In this case, the results are also stored in the main storage.

According to the present invention, the type of an operation is designated for each vector element so that a vector processing which necessitated a plurality of operations in the conventional system can be achieved through a vector processing, thereby increasing the processing speed of the vector processor.

What is claimed is:

1. A vector processor for performing a vector operation on two vectors each having a plurality of vector elements comprising:
    operation indicating means for providing respective information of an operation to be performed for each vector element of at least one of said two vectors;
    an arithmetic unit for performing a designated type of operation on each of said vector elements of each vector inputted thereto;
    first means for simultaneously supplying to said arithmetic unit said vector elements of said two vectors, respectively, said elements being supplied one at a time from each vector; and
    second means responsive to said operation indication means for designating to said arithmetic unit, each time a vector element is supplied thereto from said one of said two vectors, the type of operation to be effected by said arithmetic unit.

2. A vector processor according to claim 1 wherein said operation indicating means includes:
    store means for storing information indicating the type of an operation to be effected for each of said vector elements; and
    means for reading from said store means the information indicating the type of an operation to be effected and supplying the read information to said arithmetic unit.

3. A vector processor according to claim 1 wherein:
    said arithmetic unit includes first and second input registers,
    said first means includes means for setting one of said vector elements of said one vector and information indicating a type of operation into said first input register and one of said vector elements of the other of said two vectors in said second input register, and
    said second means including means for applying a portion of said first input register comprising said information indicating a type of operation to said arithmetic unit to control the operation thereof.

4. A vector processing system operating in response to a vector instruction for effecting an operation between two vectors each having a plurality of vector elements comprising:
    a plurality of vector registers each for storing a respective vector, said registers each having a plurality of columns for storing respective elements of said vector, said columns selectively storing in a portion thereof respective information designating for each of said vector elements a type of operation to be effected for said respective vector element;
    an arithmetic unit, having two input registers, for effecting a designated type of operation on the vector elements supplied to said input registers, one of said input registers including a control portion for storing information selectively designating said type of operation or vector data;
    selector means responsive to a control signal for controlling whether the information stored in said control portion designating the type of operation is to be supplied to said arithmetic unit to control the operation thereof or whether the content of said control portion in the form of vector data is to be inputted to said arithmetic unit together with the other portion of said one input register; and
    control means for decoding said vector instruction to designate a type of operation to said arithmetic unit when said control portion comprises vector data or to generate said control signal to control said selector to designate a type of operation to said arithmetic unit when the content of said control portion designates a type of operation.

* * * * *